United States Patent
Jacquet et al.

(12)
(10) Patent No.: US 6,697,379 B1
(45) Date of Patent: Feb. 24, 2004

(54) SYSTEM FOR TRANSMITTING MESSAGES TO IMPROVED STATIONS, AND CORRESPONDING PROCESSING

(75) Inventors: Philippe Jacquet, Buc (FR); Paul Muhlethaler, Maisons-Laffitte (FR)

(73) Assignee: Inria Institut National de Recherche en Informatique et en Automatique, Chesnay Cedex (FR)

( * ) Notice: Subject to any disclaimer, the term of this patent is extended or adjusted under 35 U.S.C. 154(b) by 0 days.

(21) Appl. No.: 09/312,486

(22) Filed: May 17, 1999

(30) Foreign Application Priority Data

May 18, 1998 (FR) .............................. 98 06244

(51) Int. Cl.$^7$ .............................................. H04L 12/56
(52) U.S. Cl. ...................................... 370/469; 370/466
(58) Field of Search ................................ 370/469, 389, 370/395.1, 351, 466

(56) References Cited

U.S. PATENT DOCUMENTS

| | | | |
|---|---|---|---|
| 5,412,654 A | | 5/1995 | Perkins |
| 6,101,543 A | * | 8/2000 | Alden et al. ................. 709/229 |
| 6,160,795 A | * | 12/2000 | Hosemann ................... 370/256 |
| 6,188,689 B1 | * | 2/2001 | Katsube et al. ............. 370/389 |
| 6,373,845 B1 | * | 4/2002 | Aramaki et al. ......... 370/395.3 |
| 6,389,023 B1 | * | 5/2002 | Matsuzawa et al. ... 370/395.31 |
| 6,490,292 B1 | * | 12/2002 | Matsuzawa ................. 370/401 |

FOREIGN PATENT DOCUMENTS

| | | |
|---|---|---|
| EP | 0 767 564 A2 | 4/1997 |
| FR | 0 838 930 A2 | 4/1998 |
| WO | WO97/01940 | 1/1997 |

* cited by examiner

*Primary Examiner*—Kenneth Vanderpuye
(74) *Attorney, Agent, or Firm*—Rabin & Berdo, P.C.

(57) ABSTRACT

A system for transmitting messages comprises stations (S) having an operating system (4), a "network" stage (3) for processing and generating messages in a first format, a communication card (1) for exchanging messages in a second format with a network, a "driver" stage (2) for putting the messages received from the card (1) or the network stage (3) in the first format or second format and transmitting them to the network stage (3) or to said card (1). The stations further comprise a management stage (5) coupled to the operating system (4) and adapted to intercept messages in the first format which are to be exchanged by the network stage and the driver stage so as to analyse the information which they contain and decide to continue their transmission, subject to any required processing, and/or adapted to generate messages in the second format, intended for the stations of the network, when a chosen condition is met.

32 Claims, 5 Drawing Sheets

SYSTEM FOR TRANSMITTING MESSAGES TO IMPROVED STATIONS, AND CORRESPONDING PROCESSING

BACKGROUND OF THE INVENTION

The invention relates to information networks or systems which allow messages to be exchanged between posts or stations.

It relates more precisely, but not exclusively, to networks wherein the transmission is of the "radio-frequency" type, i.e. those which require no connections known as "hardware support" or "wires" (such as for example cables or fiber optics).

Networks of this kind, which may be termed local, are easy to install, but they do have a drawback connected with the limited range of the transmissions, typically a few dozen meters for outputs of several Megabits per second. This limitation, which is due chiefly to the laws of physics which govern radio transmissions, is impossible to circumvent.

Those skilled in the art have proposed certain solutions for overcoming this problem, such as for example increasing the broadcasting power, or improving reception by the use of booster aerials.

As regards local networks, in particular, it is common to use stations which are at least a hundred meters apart. Some of these networks have a conventional structure in which the stations are connected at level "2", such as for example the MAC level or LLC level of the ISO model of OSI. More precisely, the stations comprise an operating system, a stage (or layer) known as "network" which processes and generates messages of a first format, a communications card for exchanging messages of a second format with other stations which belong, generally speaking, to the same network, a so-called "control" stage (known in English as the "driver", such as the MAC driver, in particular) for putting messages received from the card or the network stage, respectively, into the first format or into the second format and transmitting them to the network stage or to the card, and means for interfacing the stages, card and operating system with one another (normally software and/or connecting cables).

In this type of network, the solution proposed for relaying messages (or frames) consists in using at level 2 of each station techniques as described in FR patent 9509928 by this Applicant. These techniques require so-called "intelligent" network cards which have their own hardware and software resources. Cards of this kind are complex and expensive, which runs counter to practice in wired networks where the cards are simple in design.

SUMMARY OF THE INVENTION

The aim of the invention is therefore to provide a system for transmitting messages, and the corresponding process, which do not have the drawback mentioned above.

To this end it proposes a system of the type described in the introduction, wherein at least some stations have a management stage coupled to their operating system by interface means and placed between their network stage and their driver stage so as to carry out one and/or other of the following operations a) and b):

a) intercepting messages in the first format which have to be exchanged by the network stage and the driver stage (in the "ascending" direction and in the "descending" direction), in order to analyse the data they contain and decide to continue transmitting them between stages, subject to any processing, as a function of at least one criterion bearing on the data analysed, b) generating, spontaneously or on request, messages of a selected type, in the second format, such as for example service messages, with a view to sending them through the network via the communications card when a selected condition is met.

The definition "ascending" refers to a message (or data) coming from the driver stage and directed towards the network stage, whereas "descending" refers to a message (or data) coming from the network stage and directed towards the driver stage.

Thanks to the invention, the management stage can absorb an ascending message (e.g. qualitatively filter or extract information relating only to itself), and/or generate a descending message in order to add data thereto or to generate another descending message, and/or intercept an ascending message in order to relay (or route) it, i.e. convert it into an at least partially modified descending message and possibly transmit it jointly to the network stage.

Thus, by "decision to continue transmission" is meant a decision to convert an ascending message into a descending message, or a decision to continue the descent/ascent of a descending/ascending message, or a decision to convert an ascending message into a first ascending message and a second descending message, or a decision to interrupt the ascent of an ascending message with the purpose of using its information in the management stage (this applies particularly to service messages).

Thus, the communications card (or network card), the driver stage and the network stage (or layer) of a station may be retained without modifying their respective equipment and software.

Preferably, the operating system of the stations provided with a management stage is of the multi-task type, so that some of the processing power and the memory of the station are used for managing the connection of this station to the network, without this interfering with other applications (or tasks).

According to another feature of the invention, the messages in the second format comprise a first field (preferably formed by at least the address of the final destination station, and more preferably a first pair of addresses preferably comprising the addresses of the initial originating station and the final destination station). This first field may be replaced or, preferably, supplemented by a second field forming a "capsule" or part of a capsule, and preferably made up of at least one address of an intermediate destination station, and better still a second pair of addresses preferably comprising the address of the last station to have emitted the message received (known as the intermediate originating station) and the address of the intermediate destination station.

According to another feature of the invention, the messages in the second format may comprise data representing the type of information which they contain. In this case, the criterion chosen for the decision to continue transmission advantageously relates to the type of information contained in the messages received from one stage of the station.

According to a further feature of the invention, the messages in the second format may include data representing their sequence numbers.

According to the invention, the management stage is capable of ensuring at least one function (or treatment) selected from the encapsulation/de-encapsulation of messages to be transmitted or received, the generation of service messages, either spontaneously or on request, the routing of information, the synchronisation of the station in which the management stage is installed and possibly that of other stations in the network to which this station is connected.

The term "routing" here means determining an intermediate station address in order to (re)transmit a message in the optimum manner to one or more final destination stations, by interrogating a routing table stored in the management stage, this table being capable of being updated using topological data and/or neighbourhood data supplied by the service messages emitted by the other stations of the network.

Moreover, de-encapsulation/encapsulation refers to the removal from a message, or the addition thereto, of a capsule consisting in particular of a pair of addresses.

Moreover, the term synchronisation denotes the "alignment" of at least the transmitting/receiving means of the station with the frequency transmission mode and the reference time common to the network or at least one of its stations, so that at least the relay stations of the network are all synchronised. This synchronisation may be implemented using the synchronisation messages received from the other stations, but it may also be initiated by the driver stage of a station.

The invention also applies to stations equipped with at least two driver stages each respectively connected to, on the one hand, communication cards connected to different networks and, on the other hand, the management stage, which is capable of selecting one and/or the other of the networks with a view to transmitting a message according to the address of the intermediate destination station contained in the message which is to be transmitted. In this case, one of the networks is of the radio type whereas the other network(s) are preferably of the wired type. Thus, it is possible to use a wired network as a shortcut, or as an emergency solution when radio transmission proves impossible.

According to yet another feature of the invention, when the management stage is arranged to perform at least two different functions (or processes), it preferably comprises switching means connected to the means which perform these functions, which are capable of switching the messages (or data) depending on the type of information which they contain.

The invention also proposes a process for transmitting messages (or data or frames) between the stations of a system of the type described hereinbefore, comprising one and/or the other of the following steps:

intercepting each message which is to be exchanged between the network stage and the driver stage of a station, then analysing the information contained in the intercepted message in order to decide on continuing its transmission, possibly after processing, as a function of at least one criterion bearing on the information analysed, generating a message of a selected type for broadcast on the network when a selected condition is met.

BRIEF DESCRIPTION OF THE DRAWINGS

Other features and advantages of the invention will become apparent from studying the detailed description which follows, and the accompanying drawings, wherein.

The accompanying drawings are, essentially, of a definite nature. Consequently, they may serve not only to supplement the invention but may also contribute to the definition of the invention if necessary.

DESCRIPTION OF THE PREFERRED EMBODIMENT

Figure 1:
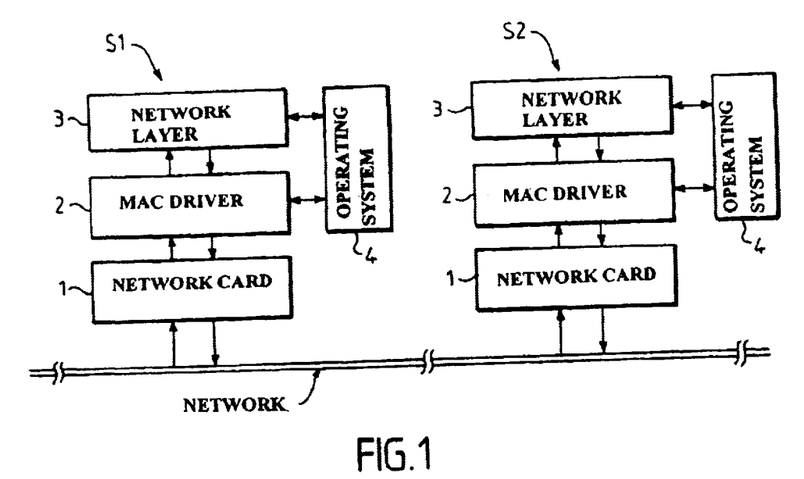
FIG. 1 is a highly simplified plan illustrating the structure of a station according to the prior art.

We will refer first to FIG. 1 to describe an embodiment of a system for transmitting messages (or data, or frames) according to the prior art.

This FIG. 1 shows part of a system for transmitting data (or network) in which stations Si (here i=1 and 2) can exchange messages (or frames) containing data (or information). Here, the system forms a local network of, the radio frequency type wherein the messages are exchanged by PCs (personal computers) through the ether. In order to permit such broadcasts, each station Si has a special communication structure organised as follows.

First, a communication card 1 known as the network card is provided, which comprises a transceiver for transmitting/receiving, a network component capable of recovering messages travelling through the medium (in this case the ether) and storing them in a buffer memory after checking that the messages (or packet, or frame) are intact.

Then, a driver stage 2 is provided, connected to the network card 1 by interface means such as an interconnecting cable, and enabling the so-called "top" layers of the network protocols to recover the messages or packets. In this example, the driver stage is of the MAC type. However, it could be a different type of driver stge, such as for example the LLC type of the ISO model of OSI. Normally, this driver stage 2 is a software layer which provides for initialisation of the communication card 1 (network card) and more particularly its transceiver and its network component.

Thereafter, "connected" to the MAC driver stage 2, is provided a so-called "network" layer 3 which is in fact the top layer of the network protocols mentioned above. Generally, it is also a software layer.

Usually, the network layer 3 and the MAC driver stage 2 are connected by standardised interface means of the software type. By way of example, in the Windows and Windows NT environments (trademarks registered by MICROSOFT) the interface is known by the name NDIS. In another example corresponding to the Novell environment, this interface is known as ODI.

The network layer (or stage) 3 and the MAC driver stage 2 are both controlled by the operating system 4 of the host station in which they are installed. In other words, they function by using the resources of the operating system 4 of the station Si.

As mentioned in the introduction, because of the physical limitations of radio transmission, it is imperative that the stations of the local network are able to relay messages or frames. In the systems of the prior art, this can only be done using frame relaying techniques of the type described in FR patent 95 09928 of this Applicant, which require "intelligent" network cards (communication cards) in order to be carried out, which goes against the grain with the skilled person on account of their complexity and high cost.

The invention will thus offer a particularly elegant solution to the drawbacks of the message transmitting systems according to the prior art.

Figure 2A:
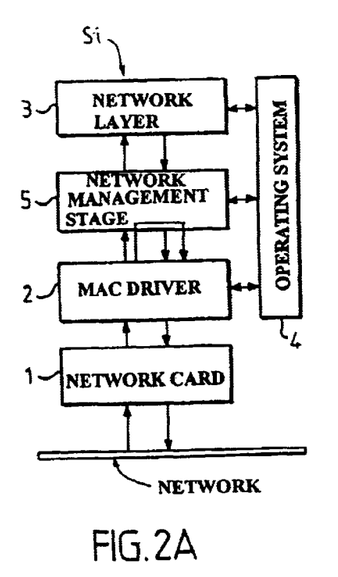
FIGS. 2A and 2B are highly simplified plans illustrating the structures of two embodiments of stations according to the invention.
Figure 3A:
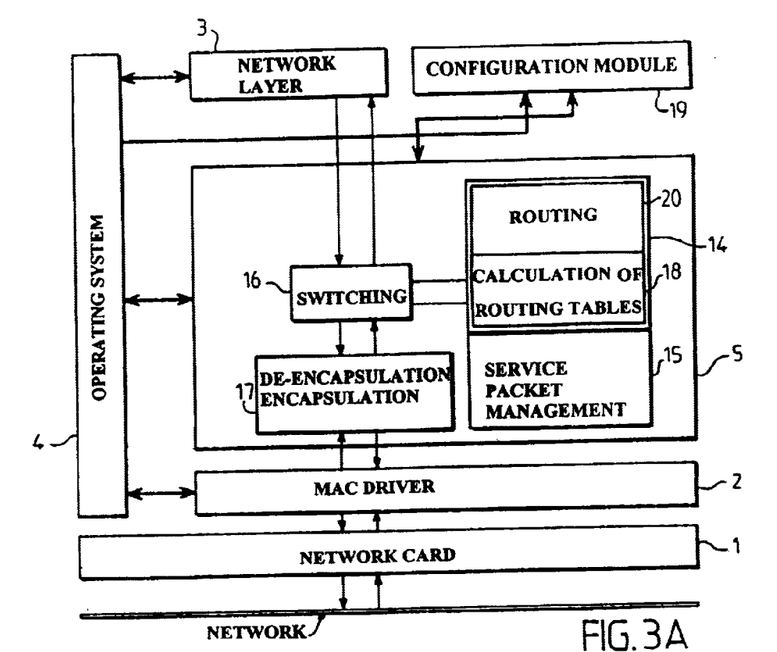
FIGS. 3A and 3B are simplified plans illustrating, in greater detail, the structures of the stations in FIGS. 2A and 2B, when their management stage is capable of performing the functions of routing and processing service messages.

Reference will now be made to FIGS. 2A and 3A to describe the general structure of the stations of a message transmitting system according to the invention.

The invention starts from the conventional structure described with reference to FIG. 1, and a network management stage (or layer) 5 using the resources of the operating system 4 is "intercalated" between the MAC driver stage 2 and the network stage (or layer) 3 of a station Si.

Preferably, and with the aim of avoiding any noticeable interference between the different applications or tasks of the operating system 4 of the host system Si and the task carried out by this network management stage 5, the operating system 4 of the station Si is selected to be of the multi-task variety. Modern operating systems have schedulers which make it possible to scrutinise the various tasks waiting, roughly every hundredth of a second. Moreover, it is sometimes possible to give priority to different tasks waiting. Consequently, it may be envisaged that basic tasks (those which are carried out at all times) remain virtually imperceptible to the user of a station.

It may be noted that in the structure shown in FIG. 1 the real-time processing is carried out by the network card, so that the tasks of the network management stage do not have to carry out such processing. It is possible to envisage processing these different tasks as basic tasks.

In the conventional structure shown in FIG. 1, the streams of data (or messages) run either in the ascending direction, i.e. from the network card 1 to the network layer 3, or in the descending direction, i.e. from the network layer 3 to the network card 1. In the structure according to the invention, the streams of data or messages which have to be exchanged between the network layer 3 and the driver stage 2 (in both directions) are intercepted. As a result, in a given station, the MAC driver stage 2 and the network management stage 3 may, in some embodiments, process messages (or frames) which are not intended for the station in question. As we will see, such a possibility will enable the station to perform the functions of connectivity and/or synchronisation which go beyond the simple, direct transmission from an originating station to a final destination station.

The network management stage 5 may, in some embodiments, be capable of generating, spontaneously or at the request of a higher level such as, for example, the network layer (or stage) 3, messages, particularly service messages, towards other stations of the local network.

It is clear that the number of different processes (or functions) which the network management stage 5 can carry out will depend on the particular requirements. Thus, this network management stage 5 may be capable only of intercepting ascending or descending messages with a view to deciding on their transmission, possibly after processing, or allowing only descending messages of a given type (e.g. service or synchronisation) to be generated, or allowing messages to be both intercepted and generated.

Figure 2B:
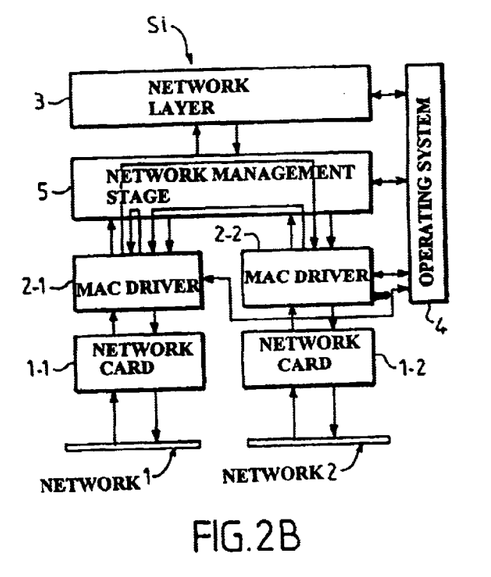

FIG. 2B shows an alternative embodiment of the structure of the station in FIG. 2A. In this alternative embodiment, the station is connected to two networks (known as network 1 and network 2). To do his, the station Si has two network communication cards 1-1 and 1-2, respectively, which are capable of sending messages into the media of networks 1 and 2, or receiving messages circulating in these media of networks 1 and 2, each network card 1-i being connected to an MAC driver stage 2-1 or 2-2 via appropriate interface means, each MAC driver stage 2-i (i=1 and 2) itself being "connected" to a single network management stage 5.

The network 1 in this case is, for example, a wireless network (or radio network) whereas the network 2 is a wired network. of course, the two networks may be radio networks transmitting on different frequencies and according to different modes or protocols.

Thus, by means of this alternative embodiment, it is possible to decide at the level of the network management stage 5 to send a message on two networks at the same time, or to re-send a message from a first network into a second network, possibly instantly, the second network here being used as a shortcut, or as an emergency network if the final destination station for a message cannot be reached by the host station which has received this message.

Obviously, the network management stage 5 could manage more than two networks, e.g. three or four or even more, by using as many driver layers or stages 2-i and network communication cards 1-i as there are networks.

In other words, to sum up, the network management stage 5 of a station Si makes it possible to set up what is known in the art as a "cable-radio" bridge.

It is clear that a network management stage 5 of this kind is preferably produced by means of software such that there is no need to modify the network layer (or stage) 3 or the MAC driver stage 2 in any way whatsoever. Of course, when one has the source codes of the MAC driver stage 2, it is possible to envisage combining the network management stage 5 and the MAC driver stage 2 to form a single stage.

Figure 3B:
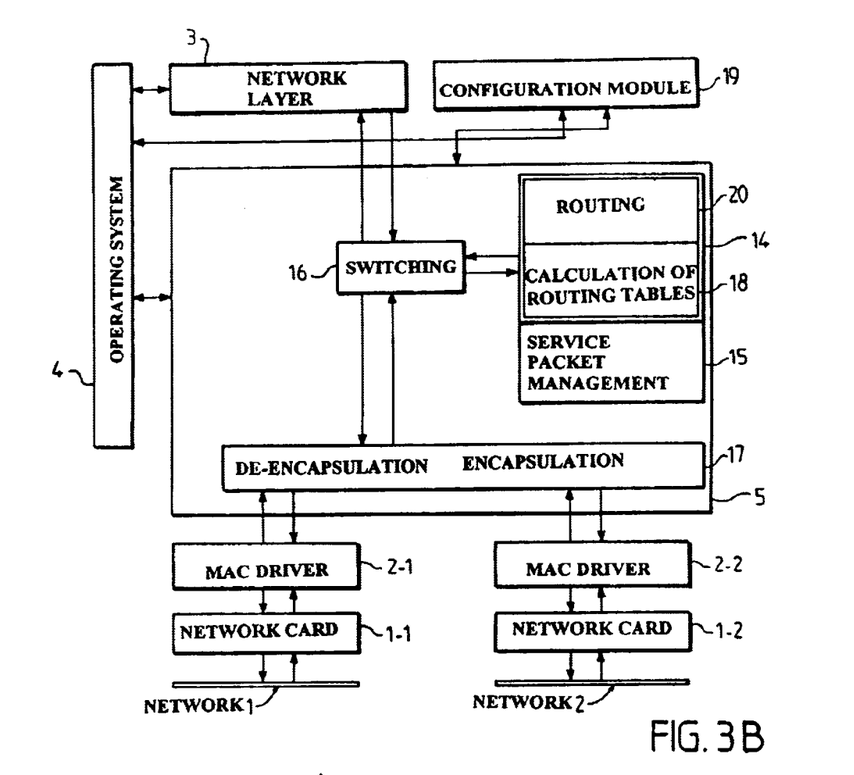

Reference will now be made to FIGS. 3A and 3B to describe in more detail the structures of the stations illustrated in FIGS. 2A and 2B, respectively.

As mentioned earlier, the network management stage 5 is capable of performing at least one function and preferably at least two. This is particularly true in the embodiments shown in FIGS. 3A and 3B. In fact, the network management stage 5 is designed so as to allow routing (in the broadest sense of the word) and management of service messages or packets.

Before the network management stage 5 is described in more detail, we will run through the general construction of a frame (or packet, or message) in a system according to the prior art.

Figure 4:
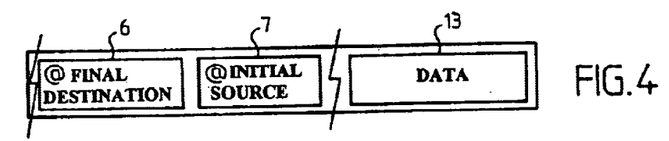
FIG. 4 shows an example of a message format used in the systems according to the prior art.

FIG. 4 shows, in highly diagrammatical form, a message as used in the systems according to the prior art. Such a message comprises at least one field containing a pair of addresses, comprising an address for the final destination station 6 and an address for the initial originating station 7, and data 13 forming the contents of the message which is to be processed. Here, the phrase final destination station 6 denotes the station for which the message is intended, whereas the initial originating station 7 is the one which has sent the message to the final destination station.

Of course, the frame shown in FIG. 4 may possibly contain other data. Such data may be found, for example, in IEEE standard 802.11.

The address of the final destination station is directly used by the network card 1 to filter the frames which reach it, so that only those frames, except for those in question, which have arrived at their destination and which are consequently intended for the host station are sent back up to the network layer 4.

Figure 5:
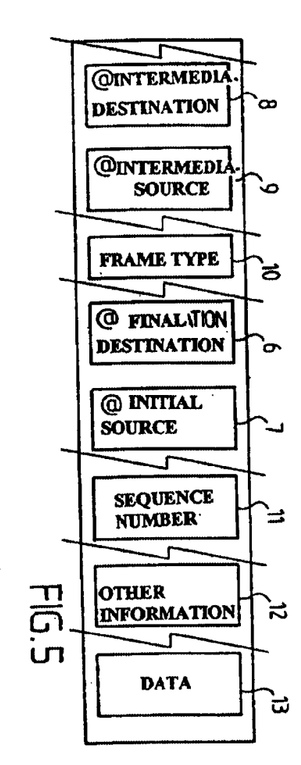
FIG. 5 shows an example of a message format used in the systems according to the invention.

FIG. 5 shows a packet (or frame, or message) of the type which may be used in a system according to the invention. As will be seen hereinafter, this type of message may contain substantially less information or fields, notably in the "broadcast" or "full promiscuous" modes which are modes known as "for broadcasting".

A frame of the type shown in FIG. 5 comprises a first field consisting of a first pair of addresses, comprising an address for the final destination station 6 and an address for the initial originating station 7, a second field consisting of a second pair of addresses, forming a capsule (or capsule portion), and comprising an address for the intermediate destination station 8 and an address for the intermediate originating station 9, a field 10 denoting the type of frame (or in other words the type of information contained in the message or frame), a field 11 denoting a sequence number, possibly other types of information 12, and data 13, forming the contents of the message which is to be processed. A frame of this kind is known as a second format frame, compared with a frame which "comes out of" the network stage 3, known as first format, and which does not have a second pair of addresses. Moreover, owing to the presence of the second pair of addresses 8 and 9 placed in front of the first pair of addresses 6 and 7, the frame is referred to as "encapsulated".

By "intermediate destination station 8" is meant the next station to which a message is to be sent, whereas the intermediate originating station 9 is the station which is going to send the message intended for the intermediate destination station 8.

As will be seen hereinafter, the frame-type field will be used to switch the incoming frame into the network management stage 5, thus optimising its processing.

The sequence number field 11 is not obligatory, but it may be useful inasmuch as it makes it possible to reject frames which have already been received or to disregard some of them.

Finally, the first pair of addresses 6 and 7 will be used in the functions of routing/relaying, which are described hereinafter, in order to optimise the choice of intermediate destination station 8.

It is clear that the final destination station 6 may be identical to the intermediate destination station 8. Similarly, when a message is sent by a given host station, the address of the initial originating station 7, which is its own address, is identical to the address of the intermediate originating station 9.

In the embodiment shown in FIGS. 3A and 3B, the network management stage 5 is required to perform the task of message routing as well as the task of managing service packets (or messages). To do this, it has a network service management module 14 and a service packet (or message) management module 15 connected to a switching module 16 which communicates, on the one hand, with the network layer 3 and, on the other hand, with a de-encapsulation/encapsulation module 17, which is itself "linked" to the MAC driver stage 2.

This de-encapsulation/encapsulation module 17 has the purpose of removing or adding the capsule (or capsule portion) consisting mainly of the second pair of addresses 8 and 9, depending on whether the data is to be transmitted up or down.

When the MAC driver stage 2 receives from the network card 1 a second format message of the type shown in FIG. 5, it sends it back up to the network layer 3. Owing to the presence of the network management stage 5, the second format message is intercepted as it leaves the MAC driver stage 3 before it arrives at the network layer 3. More precisely, this second format message is intercepted by the de-encapsulation/encapsulation module 17 which removes the capsule, i.e. the second pair of addresses 8 and 9, from it. This removal may be physical, i.e. the second format message may have this second pair of addresses 8 and 9 (or capsule, or capsule portion) removed from it, which may optionally be stored in the memory, but it may also be "virtual", with the second pair of addresses remaining in the second format message (and the message remaining, possibly stored in its entirety, in a suitable memory). The message de-encapsulated by the de-encapsulation/encapsulation module 17 is then sent to the switching module 16, which will then analyse the frame-type field which it contains in order to send the de-encapsulated message either to one of the modules 14 and 15 of the network management stage 5 or directly to the network layer 3, or to the network layer 3 and at least one of the modules 14 and 15.

It should be noted here that in the variants in which the network management stage operates only in "broadcast" mode, it is not essential for it to have a de-encapsulation/encapsulation module 17.

Of course, it might be possible for the switching to be based on the analysis of another specific field contained in the second format message, e.g. in its field 12 labelled in FIG. 5 as "other information".

In the embodiment shown in FIG. 3A, a service message received by the network management stage 5 is hence distributed by the switching module 16 to the sole service packet management module 15. Similarly, a message containing routing information or requiring routing will be distributed directly by the switching module to the routing module 14. Finally, a message containing only data 13 (or information) relating to the top layers of the station will be distributed directly by the switching module 16 to the network layer 3.

Figure 7:
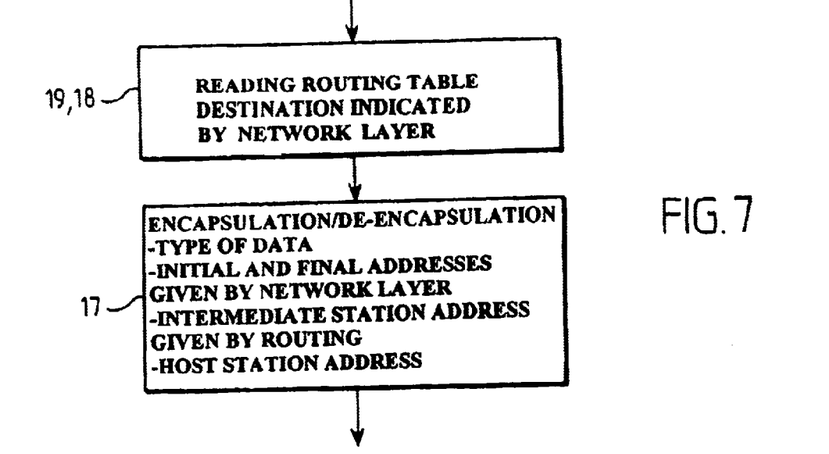
FIG. 7 shows an example of the routing of a descending message in a station of the type shown in FIG. 2A.

The opposite reasoning may be applied in the case of a descending message coming from a top layer, such as the network layer 3, and directed towards the MAC driver stage 2 (cf FIG. 7). In this case, the message supplied by the network layer 3 is in the first format, inasmuch as it contains data 13 and a first pair of addresses containing an address for a final destination station 6 and an address for an initial originating station 7 which in this case turns out to be the host station. However, this message could contain other fields different from the second pair of addresses 8 and 9.

This first format message is, unless linked to a "broadcast" type transmission, intercepted by the network management stage 5, and more precisely by its switching module 16. In fact, a first format message from the network layer 3 may contain information which is useful to one of the modules 14 or 15, or a request for sending a service message. Moreover, and in particular, the network service management module 14 (routing) has the job of determining, from the address of the final destination station 6 contained in the first pair of addresses of the first format message received from the network layer 3, the address of the intermediate destination station 8 of the second pair of addresses to which the message is to be sent.

This switching is carried out, as in the upward direction, on the basis of the analysis of the field 10, i.e. the type of frame or message.

As will be explained hereinafter, the network service management module 14 (routing) delivers, to this same switching module 16, an address for the intermediate destination station 8. The de-encapsulation/encapsulation module 17 then forms a second format message (of the type shown in FIG. 5) by adding to the first format message coming from the network layer 3 a capsule (or capsule portion) consisting of the second pair of addresses 8 and 9, which comprises the address of the intermediate destination station 8 determined by the module 14 and the address of the intermediate originating station 9, i.e. that of the host station in which it is installed.

This second format message is then transmitted to the MAC driver stage 2, then to the network card 1 for emission into the medium, in this case, the ether, towards the intermediate destination station 8 contained in the capsule (or second pair of addresses of the second format message).

In the alternative embodiment shown in FIG. 3B, the de-encapsulation/encapsulation module 17 is capable of receiving second format messages from a first MAC driver stage 2-1 and a second MAC driver stage 2-2, and of supplying these two stages, either separately or simultaneously, with second format messages generated either by one of the modules 14 or 15 of the network management stage 5 or by the network layer 3.

Of course, inasmuch as a message in the first format does not necessarily come from a top layer, of the network layer 3 type, the processing may be slightly different.

Thus the service packet management module 15 may send a service message to one or more stations of one or more networks either spontaneously or at the request of a top layer. "Spontaneously" means a message sent automatically, e.g. periodically, or sent when a topological change has taken place in a routing table for the station concerned, subsequent to receiving a service message.

A service message of this kind may also be intended for all the stations of the network, e.g. when it contains topological or neighbourhood information intended to update the routing tables of the stations of the network, and consequently intended to improve their connectivity. In this case, the service message is formed from interrogation of the contents of a routing table (or a plurality of tables or directories) stored in a memory 15 of the network service management module 14 (routing).

When the service message generated by the service packet management module 15 relates to a specific final destination station 7, the module 15 interrogates the network service management module 14 so as to determine an address of an intermediate destination station 8 which will ensure optimum routing of the service message towards the final destination station 6. The service message and the address of an intermediate destination station 8 are then transmitted to the switching module 16, then to the de-encapsulation/encapsulation module 17.

Similarly, when an ascending service message reaches the level of the switching module 16, the latter, detecting by means of its field 10 (frame type) that it is actually a service message, transmits it to the service packet management module 15, which extracts the data from it for processing.

Two types of service message (or frames) can be received or generated by the service packet management module 15. First, there are the so-called "neighbourhood" messages which are usually sent by a method known as "one jump broadcasting". Such neighbourhood messages generally contain the list of neighbours of the host station. It is useful to add, alongside each neighbouring station, a status selected from the following list: asymmetrical link, symmetrical link, multipoint relays. These neighbourhood messages are accompanied by a stamp (which may be contained, for example, in the field 11 giving the sequence number) for recognising a message carrying more recent information.

A status of the "asymmetrical link" variety indicates that the station is hearing another station and is not certain of being heard by it. By contrast, a status of the "symmetrical link" variety indicates that the station is hearing another station and is certain of being heard by it. A status of the "multipoint relay" variety is a particular status which makes it possible to designate particular stations enabling a given station to provide multipoint transmissions. As the neighbourhood messages are exchanged between stations, the statuses of the stations become more and more refined.

As for the topology messages, these are generally sent in so-called "broadcast" mode. They comprise a list of the neighbours of the emitting station (host) which makes it possible to draw up the total topology of the network.

Of course, it might be possible to use other types of topological information different from that generally used in the "link status" approach described above. For example, it might be possible to exchange only information relating to the distance between nodes. To do this, the service messages would simply have to specify the distance vector which gives, for any given point, the minimum distance separating it from any other point on the network. An approach of this kind is generally known as the "distance vector" by those skilled in the art.

Depending on the type of approach chosen, the topology messages will therefore be sent either in general broadcast mode (link status approach) or in one jump broadcast mode (distance vector approach).

Figure 6:
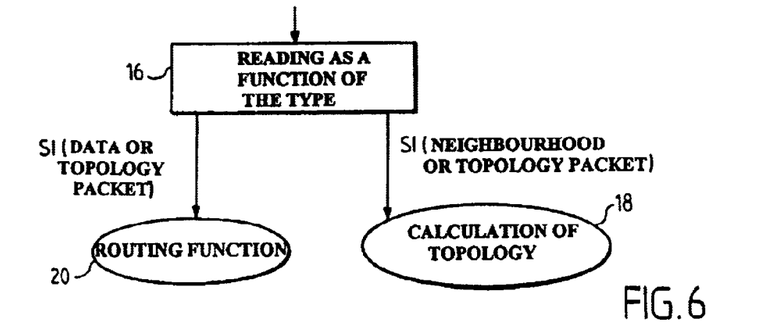
FIG. 6 shows an example of the switching of an ascending message in a station of the type shown in FIG. 2A.

The service messages which have been recognised by the switching module 16 as carriers of topological or neighbourhood information are supplied to the service packet management module 15 (see FIG. 6). This extracts the information from them and transmits it to the network service management module 14 (routing) and more precisely to a module for calculating the routing tables 18 which it contains. Preferably, the routing table or tables (or directory) are stored in this calculating module 18, so that on receiving information the calculating means can recalculate (or modify, or add to) these routing tables (or in other words update them).

Calculating a routing table may be regarded, as a first approximation, as calculating all the pathways enabling a given host station to reach the other station(s) of the network (s) to which it is connected in the optimum manner.

The calculation of the routing tables may be carried out by any method known to those skilled in the art, depending on the type of approach adopted. In particular, the number of jumps necessary to reach a destination may be calculated, for example, using DJISTRA or BELLMAN FORD algorithms.

The method of generating the service messages will depend on the variant chosen. Thus, in one particularly simple mode, the service packet management module 15 comprises a timer capable of counting down a time period of predetermined length, so that at the end of each timed period a service message will be systematically generated. The countdown defines a message generating criterion which is verified each time the end of a period is detected. Alternatively, the service message may be generated by the service packet management module 15 in response to an order (or request) received from a top layer, such as the network layer 3 of the host station, or at the request of a configuration module 19. As mentioned earlier, a service message may be emitted spontaneously when a topological change has taken place in a routing table of the station in question, on receipt of a service message.

A configuration module 19 of this kind may be formed, for example, by user software enabling a user of the computer (or host station) to get hold of information or select options, enabling them to fix the operating parameters of the various modules, stages and cards of the station. The configuration module 19 could also enable a user to access all, or only some, of the information which make it possible to draw up or modify the various routing tables stored in the network service management module 14 (routing). Similarly, a configuration module 19 of this kind could make it possible to control the length of the timing duration which fixes the time period of the criterion for generating service messages by the service packet management module 15.

Finally, a configuration module 19 of this kind may be used to display the different topological tables on the station monitor, thus showing, for example, the links between the different stations of the network(s) to which the station in which the module is installed is connected.

Figure 8:
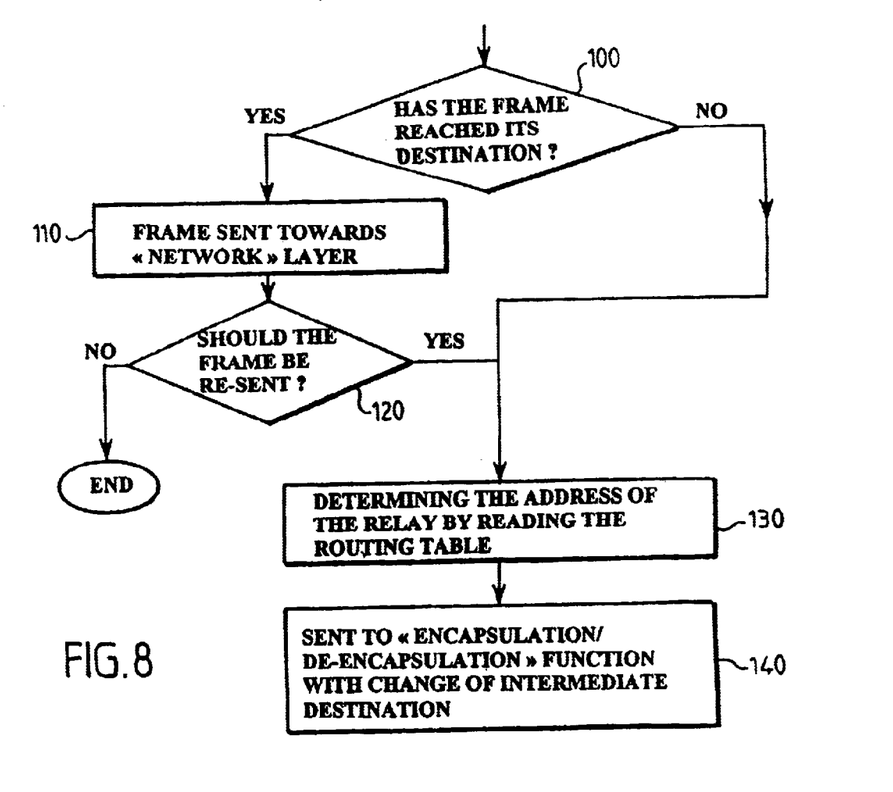
FIG. 8 is a block diagram showing the processing of an ascending message by the management stage.

Reference will now be made to FIG. 8, in particular, to describe another mode of operation of a system according to the invention.

Hitherto, particular modes of operation have been described in which an ascending or descending message is intercepted either for the purpose of being processed by one of the modules 14 or 15 or for the purpose of being transmitted to the network layer 3 or MAC driver stage 2. However, according to the invention, it is also possible to carry out re-transmission of a message received in the second format, either because it does not actually relate to the station which has just received it or because it does relate to this station but relates to others as well (message to be broadcast).

It should be noted that, as a result of the presence of the second pair of addresses 8 and 9 at the head of a message received in the second format, the latter is automatically taken into account and sent back up by the network card 1 to the MAC driver stage 2 and the network management stage 5 when this second pair of addresses has, as its intermediate destination station address, that of the host station in which the network card 1 is installed. In other words, even if the address of the final destination station 6 (contained in the first pair of addresses) is not that of the host station, the message is sent back up.

It is therefore the network management stage 5 which decides to continue transmission of a message received in the second format. To do this, the network management stage 5 is capable, on receiving an ascending message coming from the network card 1 via the MAC driver stage 2, of running a first test 100 relating to the address of the final destination station 6 contained in the first pair of addresses in the message received in the second format. If the result of this first test is positive, the switching module 16 transmits the message (optionally de-encapsulated beforehand by the de-encapsulation/encapsulation module 17) to the network layer 3, which constitutes step 110.

Then the network management stage 5 runs a second test to determine whether the message received in the second format should also be retransmitted to one or more other stations in the network(s). If the result of this test 120 is negative, the processing carried out by the network management stage 5 is ended. On the other hand, if the result of this test 120 is positive or if the result of the first test 100 is negative, the network service management module 14 (routing) and more specifically its pathway optimising module 20 proceeds, in a step 130, to determine the address of the next relay station towards which the message should be retransmitted.

To do this, the pathway optimising module 20 will read the routing table(s) stored in the calculating module 18 in order to extract an intermediate destination station address 8 and transmit it to the switching module 16 which will then pass it on to the de-encapsulation/encapsulation module 17 together with the message which is to be retransmitted.

Of course, alternatively, it might be envisaged that the message received in the second format remains in the de-encapsulation/encapsulation module 17, for example in a suitable memory, and that the switching module 16 transmits only the address of the intermediate destination station 8 to it. The de-encapsulation/encapsulation module 17 then has only to replace the second pair of addresses contained in the message received in the second format with a new second pair of addresses formed from the address of the intermediate destination station provided by the module for determining the optimum pathway 20, and the address of the intermediate originating station 9 which is none other than the address of the host station. This constitutes step 140 which completes the procedure of processing by the network management stage 5. In a situation of this kind it is advantageous that all the other parameters of the message to be retransmitted remain unchanged.

It is clear that the messages in the second format may contain a field (for example 11 or 12) enabling the network card 1 to ignore them without their going back up, and consequently avoiding the network management stage 5 having to work unnecessarily.

Figure 9:
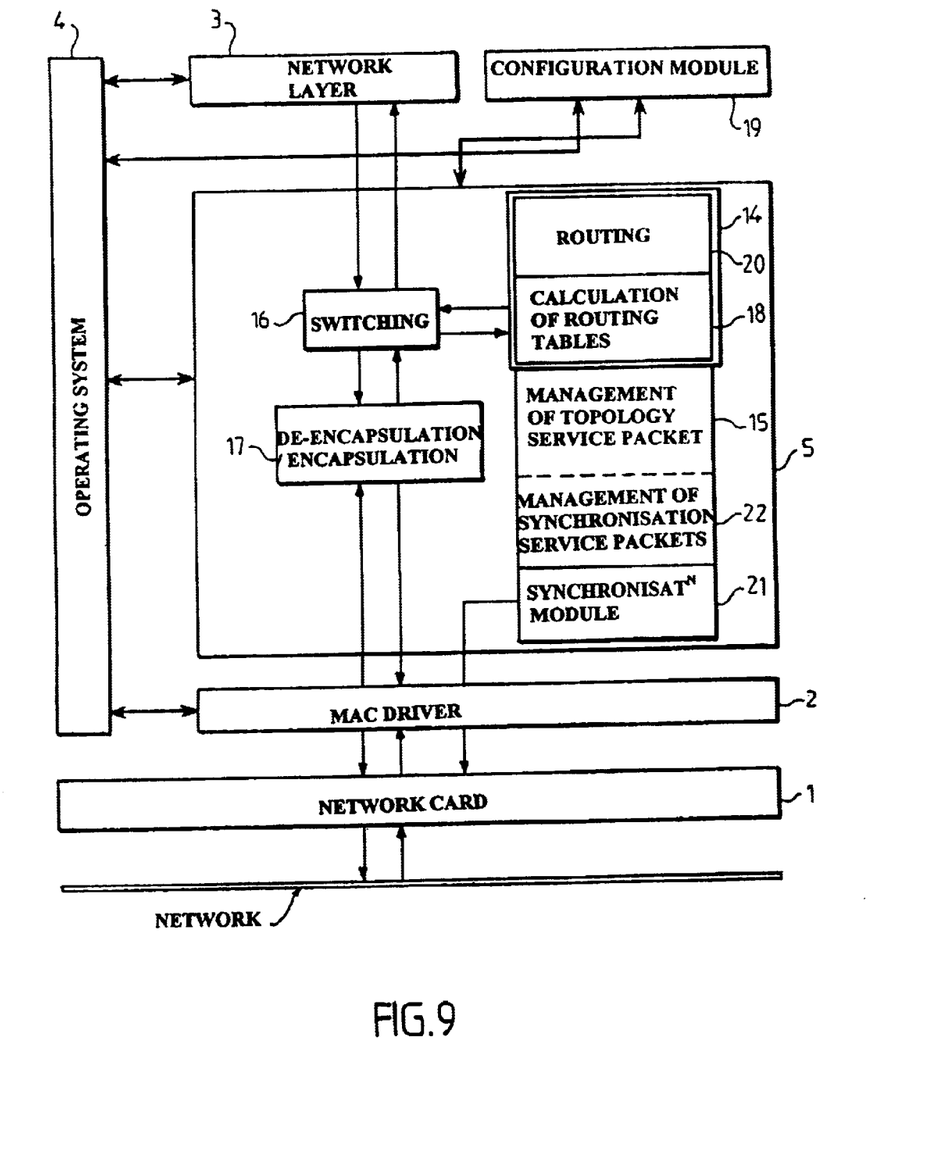
FIG. 9 is an alternative embodiment of the station shown in FIG. 3A.

Reference will now be made to FIG. 9 to describe an alternative embodiment of the network management stage 5 shown in FIGS. 3A and 3B.

In this alternative embodiment, the network management stage 5 comprises a synchronising module 21 for synchronising the host station and, more precisely, at least the emitting/receiving means thereof housed in the network card 1. Synchronisation here means both frequency synchronisation in order to be able to set the station to the broadcasting frequency of the synchronisation messages, and time synchronisation so that the host station can be supplied with a common time reference enabling it to be set effectively to the broadcast frequency mode of the synchronisation messages.

This mode of synchronisation is particularly useful in networks of the type known as "frequency jump" networks in which the emission frequency of the messages varies over time, at the stations, according to a known frequency and time plan, for example.

The synchronisation module 21 may be either tuned to the network card 1 via the MAC driver stage 2 (as shown in FIG. 9) or capable of supplying this network card 1 with synchronising information via the switching module 16, the de-encapsulation/encapsulation module 17 and the MAC driver stage 2.

According to the first hypothesis, i.e. when the synchronising module 21 drives the network card directly via the MAC driver stage 2, the driving may be carried out by a particular primitive of the MAC driver stage 2 or by an initial configuration primitive, as is conventional in the known MAC driver stages.

In order to be able to take account of the synchronisation messages circulating through the medium, in this case the ether, it is advantageous for the service packet management module 15 to have a section 22 dedicated to the management of the synchronisation messages. Thus, the generating of service messages, be they topological messages, neighbourhood messages or synchronisation messages, may be managed by a single service packet management module 15. Naturally, the section 22 of this service management module, dedicated to the synchronisation message, correlates strictly with the synchronisation module 21 so as to supply it with the synchronisation data contained in the synchronisation messages received from the switching module 16.

Alternatively, the synchronising module might comprise its own means for managing synchronisation service packets.

The data relating to the common frequency, contained in the synchronisation messages, may comprise either the list of frequencies of the development plan of the common frequency and the respective durations of these frequencies, or an identifier of a list of associated frequencies and durations, the stations then having a memory in which is stored a table of correspondence between the list identifiers and the lists and durations.

By means of the synchronisation module, the invention also makes it possible to manage the exchanges of messages between networks operating according to different synchronisations.

Moreover, thanks to the network management stage 5, it is also possible to manage the exchanges of messages between the networks or sub-networks designated by different numbers contained in a specific field of the messages in the second format.

The invention also relates to the processes for transmitting messages (or data, or frames) using the relay stations described hereinbefore, and comprising one and/or the other of the following steps a) and b):

a) intercepting each message (data, service, topological, neighbourhood or synchronisation) which is to be exchanged between the network stage 3 and the driver stage 2 of a station Si (in the ascending or descending direction), then analysing the information contained in the intercepted message so as to decide to continue its transmission, subject to any processing (e.g. de-encapsulation followed by transmission to one of the modules 14 or 15 or to the network stage 3, or encapsulation with or without routing), as a function of at least one criterion relating to the information analysed, and preferably on a field such as the type in said information, b) generating a message of a selected type (e.g. a topological or neighbourhood service message, or a synchronisation message), spontaneously or on request from a top layer (network stage 3 or configuration module 19), with a view to sending it through the medium of a network (or through that of at least one of the networks when the station is connected to a number of networks), as soon as a selected condition has been met (e.g. on receipt of a request or at the end of a timed period).

The process may also include all the processing steps described hereinbefore with reference to the alternative systems.

In the foregoing description, there has been talk of stations (PC-type computers) equipped with modules and other means. These modules and means include both specific electronic components (or circuits) and programmed procedures.

The invention is not restricted to the embodiments described above purely by way of example but also extends to the alternative systems and processes which may be developed by the skilled person within the scope of the claims which follow.

Thus, messages in the second format are described, comprising first and second fields each consisting of a first or second pair of addresses. However, it would also be possible for a message in the second format to have only a second field, this field preferably consisting of the single address of the intermediate station determined by the management stage. Similarly, operating modes might be envisaged in which the messages in the second format comprise a first and second field consisting, respectively, of the single address of the final originating station and of the single address of the intermediate station determined by the management stage.

Moreover, it would be possible for the second format to have, or resemble, the forms specified in the standards 802.11 and HIPERLAN, respectively. It is also conceivable for the abovementioned formats to be used with slight modifications relating to the use of certain fields. For example, the standard 802.11 contains fields which may carry the address of the bridges between the radio network and a distribution system. These fields could be used to identify intermediate stations. Similarly, the standard 802.11 offers the possibility of distinguishing the different types of frames; this possibility could be used in the invention to discern the different service frames (or messages).

What is claimed is:

1. System for transmitting messages between stations (S), each comprising:
   an operating system (4),
   a "network" stage (3) for processing and generating messages in a first format,
   a communication card (1) suitable for exchanging messages in a second format with at least one network,
   a "driver" stage (2) arranged to place the messages received from the card (1) or the network stage (3) respectively in the first format or second format in order to transmit them to the network stage (3) or to said card (1), and
   interface means for said stages/card and operating system to interface with one another,
      characterised in that some stations (S) at least comprise a management stage (5) coupled with said operating system (4) by said interface means and arranged to intercept messages in the first format which are to be exchanged by the network stage (3) and the driver stage (2) so as to analyse the information which they contain and decide to continue their transmission, subject to any required processing, as a function of at least one criterion relating to said information analysed, and/or arranged to generate messages of a selected type, in the second format, with a view to sending them through the network via said card (1) when a chosen condition is met.

2. System according to claim 1, characterised in that the operating system (4) is a multi-task system.

3. System according to claim 1, characterised in that the messages in the second format comprise a first field (6, 7).

4. System according to claim 3, characterised in that the first field comprises at least one final destination station address (6).

5. System according to claim 4, characterised in that the first field comprises a first pair of addresses comprising an initial originating station address (7) and the final destination station address (6).

6. System according to claim 1, characterised in that said messages in the second format comprise a second field (8, 9) forming at least part of a capsule.

7. System according to claim 6, characterised in that the second field comprises at least one intermediate destination station address (8).

8. System according to claim 7, characterised in that the second field contains a second pair of addresses comprising the last station address, known as the intermediate originating station (9), which has emitted the message in the second format, and the intermediate destination station address (8).

9. System according to claim 1, characterised in that the messages in the second format comprise data (10) representing the type of information which they contain.

10. System according to claim 9, characterised in that the chosen criterion relates to the type of information (10) contained in the messages received from a stage.

11. System according to claim 1, characterised in that the messages in the second format comprise at least one other piece of information, particularly representing their sequence number (11).

12. System according to claim 1, characterized in that each said at least one network is selected from the group consisting of radio and wired networks.

13. System according to claim 12, characterised in that the format of a radio network is selected from at least the format of the "HIPERLAN" standard and the format of the IEEE standard 802.111, and in that the format of a wired network is selected from at least the ISO standards for the IEEE standards 802.3, 802.5 and 802.14.

14. System according to claim 4, characterised in that the management stage (5) comprises routing means (14, 18, 20) adapted to store at least one routing table comprising at least the address of the intermediate destination stations with which the station which receives it can exchange messages in the second format, and in that the routing means (14, 18, 20) are arranged in order, on the one hand, to extract the first field (6, 7) from a message received in order to determine in the routing table an intermediate destination station address (8) for optimising the transmission of said message to the final destination station (6) the address of which is contained in the first field extracted, and, on the other hand, to form a second field containing said intermediate destination station address (8) extracted and intended either to replace the one initially contained in the second field of the message received which is to be retransmitted, if the message has come from the driver stage (2), or to complete its contents with a view to transmitting it, if the message has come from the network stage (3).

15. System according to claim 14, characterised in that the routing means (14, 18, 20) further comprise calculating means (18) adapted to modify the contents of said routing table on the basis of routing information contained in the service messages in the second format coming from the network.

16. System according to claim 14, characterised in that at least one of the stations (S) provided with a management stage (5) comprises at least one other driver stage (2-2) connected to said management stage and to another communication card (1-2) connected to another network, and in that the management stage (5) is arranged to select at least one of the networks with a view to transmitting messages, as a function of the intermediate destination station address (8) contained in the second field of the message to be transmitted.

17. System according to claim 5, characterised in that it comprises de-encapsulating/encapsulating means (17) adapted to extract a second field, or at least a capsule portion, from a message coming from the driver stage (2) or to add a second field to a message intended for at least one station of the network via this driver stage (2).

18. System according to claim 1, characterised in that the management stage (5) comprises service message management means (15).

19. System according to claim 18, characterised in that the service message management means (15) are adapted to generate messages "for broadcasting" for multiple final destination stations belonging to at least one network.

20. System according to claim 18, characterised in that the service message management means (15) comprise timing means adapted to count down a chosen period so that after the end of each countdown period a service message is generated, said end defining the selected condition which is met.

21. System according to claim 18, characterised in that the service message management means (15) are arranged so as to emit a service message after each modification of the routing table, said modification defining the selected condition which is met.

22. System according to claim 1, characterised in that the stations (S) comprise configuration means (19) for the various stages and card(s) connected thereto and to said operating system by said interface means.

23. System according to claim 18, characterised in that the service message management means (15) are adapted to generate a service message at the local request of the network stage (3) or the configuration means (19), said request defining the selected condition which is met, wherein the stations (S) comprise configuration means (19) for the various stages and card(s) connected thereto and to said operating system by said interface means.

24. System according to claim 16, wherein the stations (S) comprise configuration means (19) for the various stages and card(s) connected thereto and to said operating system by said interface means, characterised in that the routing information is contained in messages coming from the configuration means (19).

25. System according to claim 1, characterised in that the management stage (5) comprises synchronising means (21, 22) arranged to form messages synchronised in frequency and time, intended for certain other stations, and, on receiving a synchronisation message, to extract the information therefrom so as to put the emitting/receiving means of the communication card (1) of their station into the state corresponding to the information extracted.

26. System according to claim 25, characterised in that the synchronising means (21, 22) are arranged so as to generate said synchronising message spontaneously, particularly periodically.

27. System according to claim 25, characterised in that the synchronising means (21, 22) are arranged so as to generate said synchronising message at the local request of the network stage (3) or the configuration means.

28. System according to claim 25, characterised in that the synchronising means (21, 22) are arranged so as to generate interrogation messages demanding that a synchronisation message is sent.

29. System according to claim 9, further comprising
de-encasulating/encansulating means (17) adapted to
extract a second field, or at least a capsule portion, from a message coming from the driver stage (2) or to add a second field to a message intended for at least one station of the network via this driver stage (2), wherein the management stage (5) comprises service message management mans (15), and synchronizing means (21, 22) arranged to form messages synchronized in frequency and time, intended for certain other stations, and, on receiving a synchronization message, to extract the information therefrom so as to put the emitting/receiving means of the communication card (1) of their station into the state corresponding to the information extracted, characterised in that the management stage (5) comprises switching means (16) connected to said de-encapsulating/encapsulating means (17), to said routing means (14, 18, 20), to said service message management means (15) and to said synchronizing means (21, 22).

30. System according to claim 29, characterised in that the switching means (16) are adapted to determine, from the type of messages received, the stage (stages), among the network stage (3) and the driver stage (2), and/or the means, among the routing means (14, 18, 20), the de-encapsulating/encapsulating means (17), the synchronising means (21, 22) and the service message management means (15), which is or are affected by a message which they have received, and to transmit said message to the stage (stages) or means thus determined.

31. System according to claim 1, characterised in that the management stage (5) forms part of the driver stage (2).

32. Process for transmitting messages between the stations (S) of a system according to claim 1, characterised in that it comprises one and/or the other of the following steps:
   a) intercepting messages which have to be exchanged between a network stage (3) and a driver stage (2) of a station (S), then analysing the data contained in said intercepted messages so as to decide to continue transmitting them, subject to any processing, as a function of at least one criterion bearing on the data analysed,
   b) generating a message of a selected type, with a view to broadcasting it in the network when a selected condition is verified.

* * * * *